United States Patent
Grimes

(10) Patent No.: US 10,898,843 B2
(45) Date of Patent: Jan. 26, 2021

(54) REUSABLE AIR FILTER

(71) Applicant: Samuel Stephen Grimes, Mount Olive, AL (US)

(72) Inventor: Samuel Stephen Grimes, Mount Olive, AL (US)

(*) Notice: Subject to any disclaimer, the term of this patent is extended or adjusted under 35 U.S.C. 154(b) by 432 days.

(21) Appl. No.: 15/878,605

(22) Filed: Jan. 24, 2018

(65) Prior Publication Data

US 2018/0207572 A1     Jul. 26, 2018

Related U.S. Application Data

(60) Provisional application No. 62/450,251, filed on Jan. 25, 2017.

(51) Int. Cl.

| | | |
|---|---|---|
| B01D 53/22 | (2006.01) | |
| B01D 46/42 | (2006.01) | |
| B01D 46/00 | (2006.01) | |
| B01D 46/12 | (2006.01) | |
| B01D 39/08 | (2006.01) | |
| B01D 39/12 | (2006.01) | |

(52) U.S. Cl.
CPC .......... *B01D 46/4245* (2013.01); *B01D 39/08* (2013.01); *B01D 39/12* (2013.01); *B01D 46/0005* (2013.01); *B01D 46/0032* (2013.01); *B01D 46/12* (2013.01); *B01D 46/4209* (2013.01); *B01D 2239/065* (2013.01); *B01D 2267/30* (2013.01); *B01D 2267/40* (2013.01); *B01D 2275/205* (2013.01)

(58) Field of Classification Search
CPC .......... B01D 2275/205; B01D 46/0005; B01D 46/4245; B01D 2239/065; B01D 39/12; B01D 2267/40; B01D 2267/30; B01D 39/08; B01D 46/12; B01D 46/4209; B01D 46/0032

See application file for complete search history.

(56) References Cited

U.S. PATENT DOCUMENTS

| | | | | |
|---|---|---|---|---|
| 4,506,240 A | * | 3/1985 | Shores | H01P 1/218 333/202 |
| 5,059,218 A | * | 10/1991 | Pick | B03C 3/155 160/371 |
| 5,567,230 A | * | 10/1996 | Sinclair | B64D 11/00 454/154 |
| 5,954,933 A | * | 9/1999 | Ingalls | B03C 5/02 204/557 |
| 5,958,097 A | * | 9/1999 | Schlor | B01D 29/012 55/497 |
| 6,106,592 A | * | 8/2000 | Paranjpe | B03C 3/53 95/65 |
| 8,057,608 B1 | * | 11/2011 | Saaski | B08B 3/102 134/104.2 |

(Continued)

*Primary Examiner* — Anthony R Shumate
(74) *Attorney, Agent, or Firm* — Dunlap Bennett & Ludwig, PLLC

(57) ABSTRACT

An air filtration system is provided. The air filtration system embodies filtration material supported by a frame, wherein the air filtration system provides two framed filtration materials sandwiching a fabric filter. Such framework may be removably engaged through magnetic forces. The filtration material may hold and/or carry electrostatic forces and/or magnetostatic forces induced through a current from an electrical power source and/or magnetic forces of the magnetics.

11 Claims, 4 Drawing Sheets

(56) References Cited

U.S. PATENT DOCUMENTS

| | | | | |
|---|---|---|---|---|
| 9,925,486 | B1* | 3/2018 | Botti | B01D 46/0005 |
| 10,004,163 | B2* | 6/2018 | Smith | H05K 7/20736 |
| 2003/0061934 | A1* | 4/2003 | Ilmasti | B03C 3/60 |
| | | | | 95/57 |
| 2003/0230063 | A1* | 12/2003 | Kubokawa | B01D 46/10 |
| | | | | 55/497 |
| 2011/0016663 | A1* | 1/2011 | Horne | A47L 9/12 |
| | | | | 15/347 |
| 2011/0114555 | A1* | 5/2011 | Coulson | B01D 39/1623 |
| | | | | 210/508 |
| 2011/0209978 | A1* | 9/2011 | Leichner | B01J 19/12 |
| | | | | 204/155 |
| 2012/0207647 | A1* | 8/2012 | Kim | A61L 9/00 |
| | | | | 422/107 |
| 2012/0240535 | A1* | 9/2012 | Mann | B01D 46/0005 |
| | | | | 55/385.7 |
| 2016/0135619 | A1* | 5/2016 | Shields | A47G 1/065 |
| | | | | 40/711 |
| 2016/0349534 | A1* | 12/2016 | Lando | G02C 5/20 |
| 2017/0144093 | A1* | 5/2017 | Neri | B01D 46/4227 |
| 2018/0015404 | A1* | 1/2018 | Branzelle | B01D 46/0009 |
| 2018/0361009 | A1* | 12/2018 | Kim | H01T 19/00 |
| 2019/0126183 | A1* | 5/2019 | Corbett | B01D 46/0004 |
| 2019/0314746 | A1* | 10/2019 | Leung | B32B 5/26 |
| 2019/0321769 | A1* | 10/2019 | Kim | B01D 53/8678 |
| 2020/0009489 | A1* | 1/2020 | Sugamata | B32B 27/08 |

* cited by examiner

REUSABLE AIR FILTER

CROSS-REFERENCE TO RELATED APPLICATION

This application claims the benefit of priority of U.S. provisional application No. 62/450,251, filed 25 Jan. 2017, the contents of which are herein incorporated by reference.

BACKGROUND OF THE INVENTION

The present invention relates to managing air quality and, more particularly, to a reusable air filter system.

Unhealthy pathogens, such as mold, bacteria, and viruses, circulate in our HVAC systems. Current air quality solutions, specifically metal reusable air filters, lack effective germicidal and antimicrobial attributes, especially in terms of utilizing electrostatic properties.

As can be seen, there is a need for reusable air filters utilizing electrostatic properties to rapidly kill microbes such as mold, bacteria, and viruses upon contact, such as present invention. The present invention is more effective against microbial pathogens relative to current air filters by multiple orders of magnitude, in part, through electrostatic and metallurgical properties of certain reusable metals of the filtration material.

SUMMARY OF THE INVENTION

In one aspect of the present invention, an air filter system includes two frames; each frame circumscribing an exterior filter made of filtration material, and each frame having an inner periphery; a plurality of joining elements spaced apart along each inner periphery so that said inner peripheries flushly interface; and the filtration material adapted to carry electromagnetic forces.

In another aspect of the present invention, the air filter system includes two frames; each frame circumscribing an exterior filter made of filtration material, and each frame having an inner periphery; a plurality of joining elements spaced apart along each inner periphery so that said inner peripheries flushly interface; an electrical source coupled to at least one of the two frames, wherein the filtration material adapted to carry electromagnetic forces induced by the electrical source.

In yet another aspect of the present invention the air filter system includes two frames; each frame circumscribing an exterior filter made of filtration material, and each frame having an inner periphery; a plurality of opposing polarity magnets spaced apart along each inner periphery so that said inner peripheries flushly interface; and the filtration material adapted to carry electromagnetic forces induced by the plurality of opposing polarity magnets.

These and other features, aspects and advantages of the present invention will become better understood with reference to the following drawings, description and claims.

DETAILED DESCRIPTION OF THE INVENTION

Figure 1:
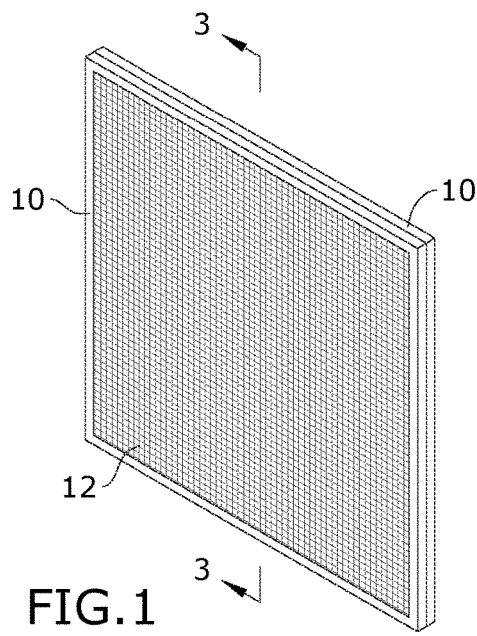
FIG. 1 is a perspective view of an exemplary embodiment of the present invention.
Figure 2:
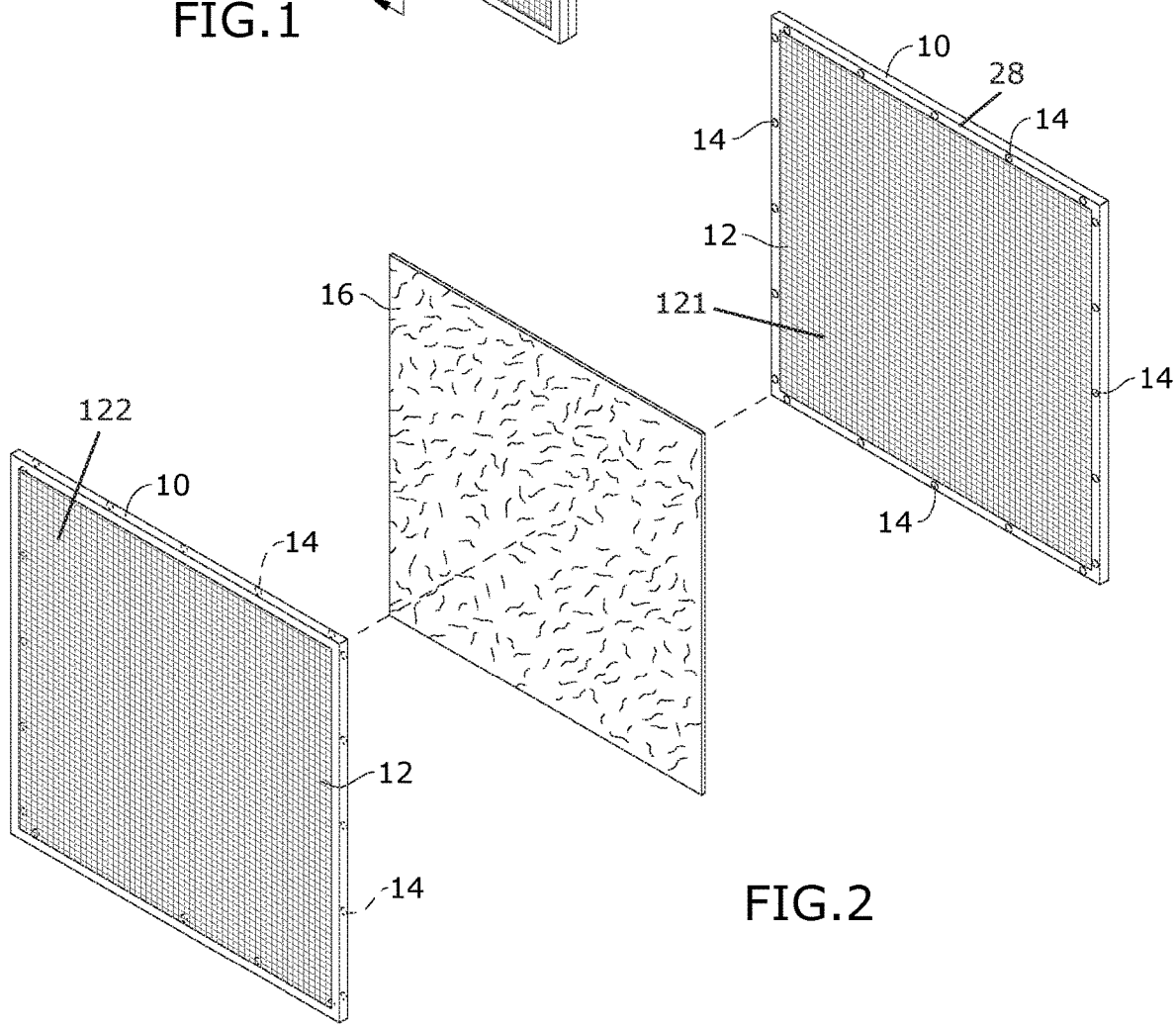
FIG. 2 is an exploded perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an air filtration system embodying filtration material supported by a frame, wherein the air filtration system provides two framed filtration materials sandwiching a fabric filter. Such framework may be removably engaged through magnetic forces. The filtration material may hold and/or carry electrostatic forces and magnetostatic forces induced through a current from an electrical power source and/or magnetic forces of magnetics.

Referring to FIGS. 1 through 5, the present invention may include an air filter system 50 embodying an interior filter 16 sandwiched by exterior filters 12. Each exterior filter 12 may be circumscribed by a frame 10 maintaining the exterior filter's 12 form. The shape of the exterior filter 12/frame 10 can be substantially planar and square, rectangular, circular, oval, triangular or other geometric shapes so long as the exterior filter 12/frame 10 function in accordance with the present invention as described herein. Each exterior filter 12 may be a screen, mesh or screen-mesh of filtration material, wherein the exterior filter 12 are dimensions and adapted to allow air to pass through. The mesh/screens are generally configured from staggered, intersecting or crossed lines at predetermined angles or offset sinusoidal arrangement with a desired density so that no alignment of air can flow without striking the copper screen.

Figure 3:
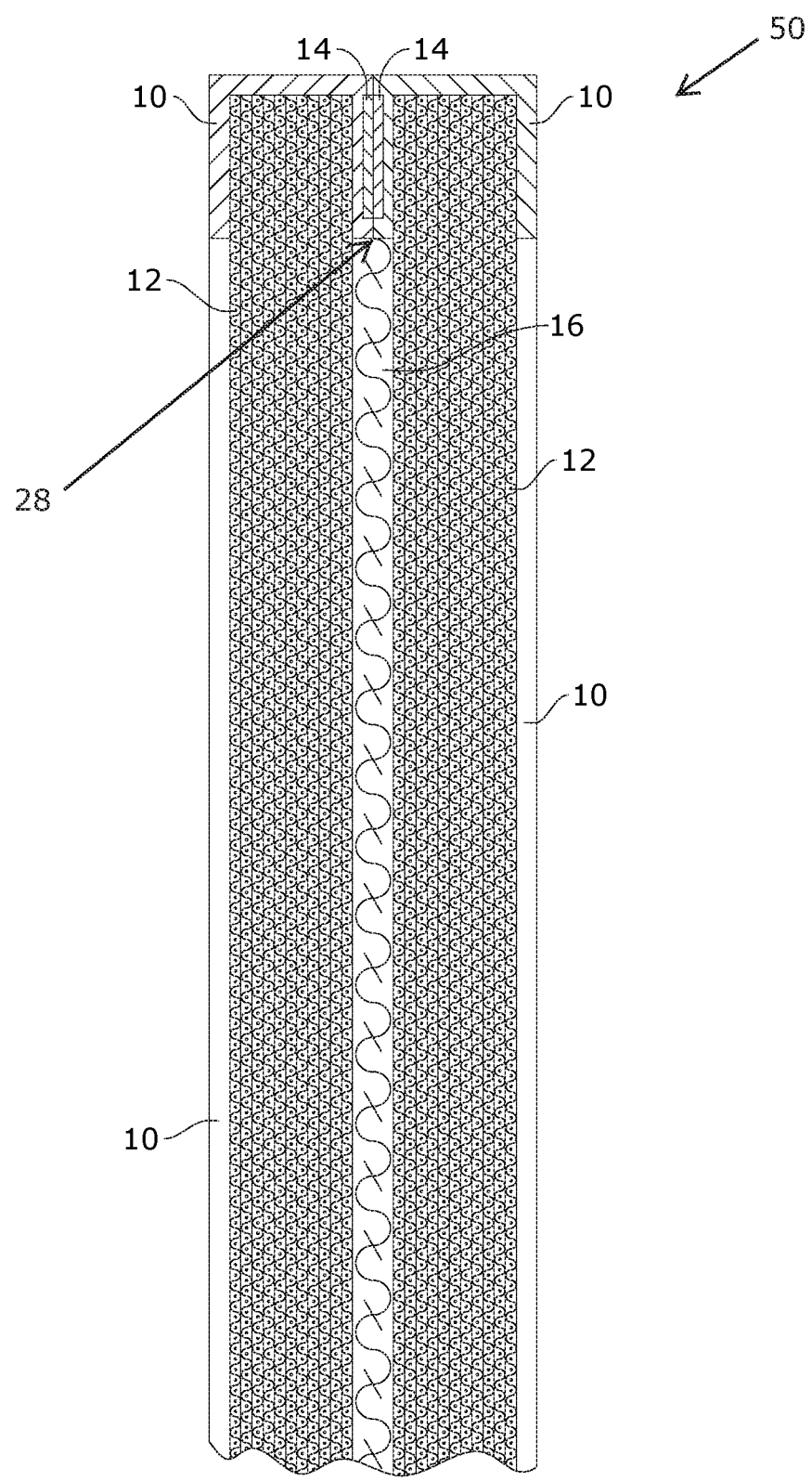
FIG. 3 is a section view of an exemplary embodiment of the present invention, taken along line 3-3 in FIG. 1, with the exterior filter layer thicknesses enlarged for clarity.
Figure 4:
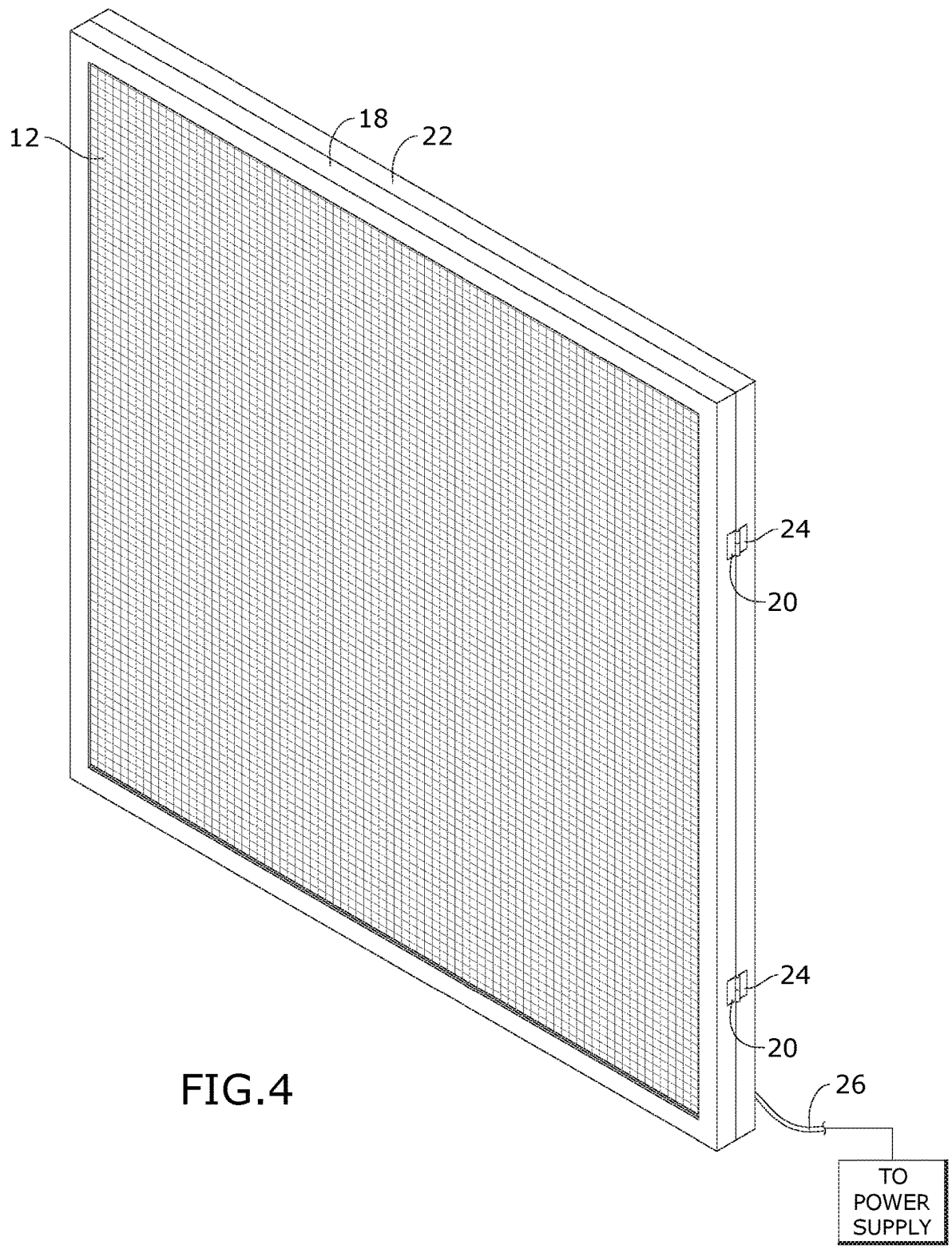
FIG. 4 is a perspective view of an exemplary embodiment of the present invention, shown with optional charging current and insulating harness.
Figure 5:
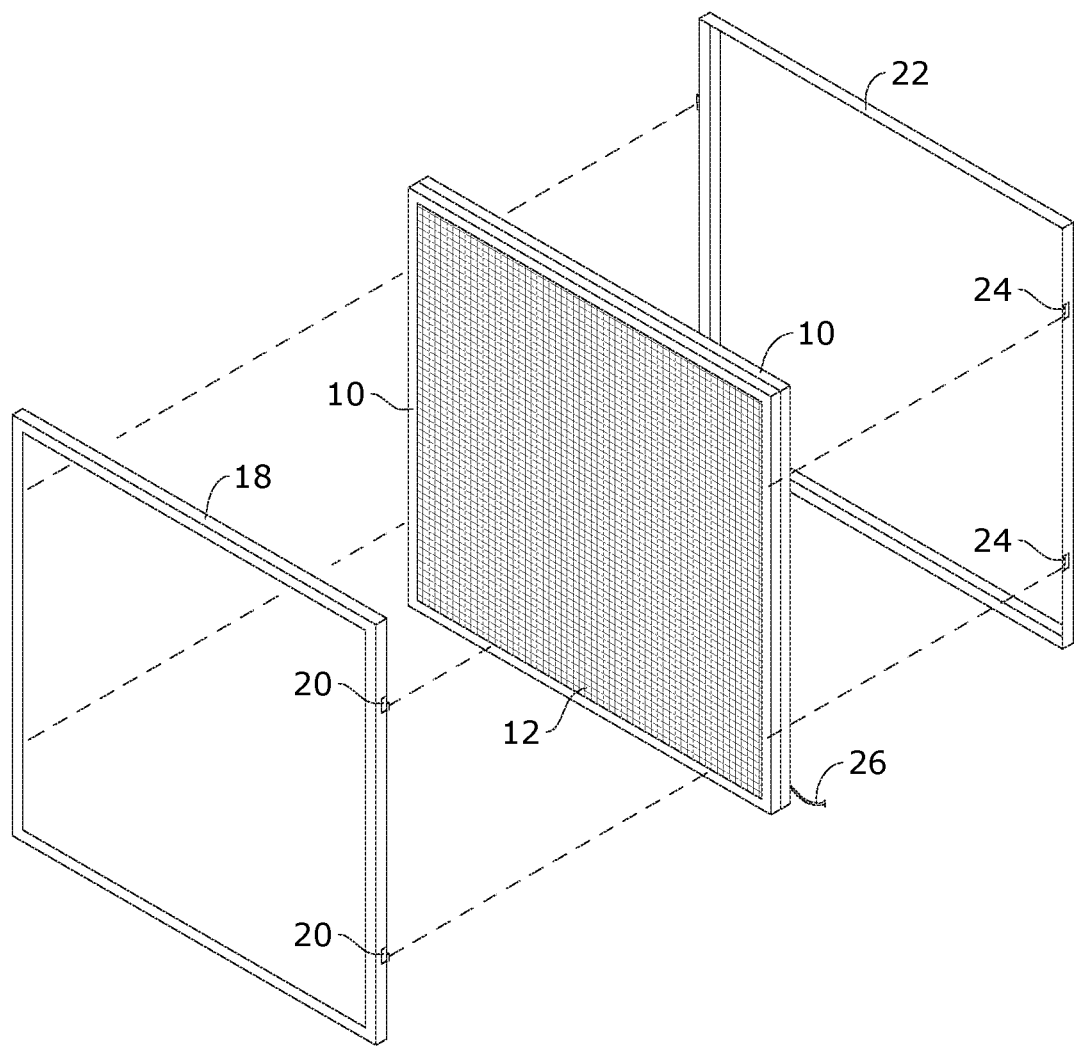
FIG. 5 is an exploded perspective view of an exemplary embodiment of the present invention.

Along an inner periphery 28 of one or more frame 10 may be joining elements 14, such as magnets. Though it should be understood that the sandwiching frames 10 may include any fastener known in the art for removably securing one object to another including, for example, hook and loop fasteners, adhesive substances, and the like. Specifically, the joining elements 14 may be embedded in (cavities along) the inner periphery 28 so that when the two sandwiching frames 10 are joined, the respective inner peripheries 28 define a flush interface, as illustrated in FIG. 3. The joining elements 14 may be disposed in alignment along opposing sandwiching inner peripheries 28 to further facilitate the flush interface. If the joining elements 14 are magnets, they may be urging opposing polarities relative to their respective opposing inner periphery 28.

The two inner peripheries 28 of each frame 10 may extend inward toward each other, thereby defining a nesting space into which a peripheral edge of each respective exterior filter 12 may slidably nest into, as illustrated in FIG. 3.

The exterior filter 12/frame 10 may be made of certain filtration materials exhibiting predetermined electrostatic and metallurgical properties, such as copper, silver, or the like. The electrostatic attraction between the filtration material and microbes present in the flow of air through the exterior filter 12 may be enhanced by grounding the first exterior filter 121 and/or by charging the second exterior filter 122 with a direct current or weak alternating current to further accelerate the destruction of the microbes. The voltage difference may be provided through an electrical connection 26 coupled to a power/voltage source, such as an electrical outlet (not shown).

The present invention may include first and second harnesses 18 and 22 made of insulating material, such as plastic or the like, so as to act as an electrical insulator. The first and second harnesses 18 and 22 may be pivotally connected to each other by pivotal connections 20 and 24, respectively, so that the first and second harnesses 18 and 22 are movable between an open and closed condition securing the air filter system 50 therein. The pivotal connections 20 and 24 may be slip hinges. The first and second harnesses 18 and 22 facilitate that the positively charged side is separated from the negatively charged or grounded side.

The slip harnesses 18 and 22 are intended to physically separate and insulate the positively charged exterior filter 121/frame 10 from the negatively charged exterior filter 122/frame 10 such that the insulating harnesses 18 and 22 would separate and insulate the two opposingly charged components from one another. In other words, the slip harnesses 18 and 22 may be adapted to physically separate the flushly engaged inner peripheries 28. In certain embodiments, the inner peripheries 28 may provide insulating material, such as a coating, that also coats the joining elements 14, and/or the joining elements 14 themselves are made from insulating material. With the inner peripheries 28 insulated, the interior filter 16 would act as an insulator relative to the two opposing exterior filters 12/filtration material, by physically separating them. In the alternative, the interior filter 16 could be extended to an outer periphery of the frames 10, so as to physically separate the inner peripheries 28, thus separating and insulating the two frames 10. Also, the two frames 10 could be joined by plastic screws and wing nuts which would clamp the two conductive frames 10 together with the extended interior filter 16 between the two frames 10 and filtration material thereby providing insulation therebetween, instead of the insulating harnesses 18 and 22.

The interior filter 16 may be composed of reusable cotton, wool, linen, or hemp, or the like that may act as an electric insulator. The interior filter 16 may be changed daily or weekly and placed in a washing machine and dryer. The interior filter 16 may be removably positioned between the first and second exterior filters 121 and 122. This fabric may be sprayed with natural antimicrobials prior to reinstalling.

It should be understood by those skilled in the art that the use of directional terms such as inner, inward, exterior, and the like are used in relation to the illustrative embodiments as they are depicted in the figures—i.e., the inner direction being directed toward an inner portion of the filter sandwich, and the inward direction similarly directed toward said inner portion, though corresponding in a direction generally orthogonal with the inner direction.

A method of using the present invention may include the following. The air filter system 50 disclosed above may be provided. A user may utilize the air filter system 50 in place of normal paper air filters currently on the market. As air flows through the air filter system 50, the air will strike the filtration material of the exterior filters 12. The magnetic polarity and/or the electrostatic attraction will attract pathogen-containing dust to strike the filtration material which will rapidly kill mold, microbes, and pathogens. The interior filter 16 positioned within the two sandwiching frames 10 may be changed daily or weekly, cleaned in a washing machine or dryer, or dried in the sun. This interior filter 16 may be sprayed before reinstalling with antimicrobial liquids such as oil of oregano for additional protection. The exterior filters 12 may be immersed in water or bleach and dried in the sun. The exterior filters 12 would have slits at the bottom in order for liquid to drain. The exterior filters 12 should be purchased in duplicate so that a clean version may always be available.

The present invention would provide the benefit of saving expense by being reusable and by promoting cleaner household air by killing many microbes found in dust which can lead to disease and chronic ailments. Furthermore, the present invention could be used in residential, commercial, industrial, or agricultural environments. It could also as a water filter to eliminate metals such as iron from water.

It should be understood, of course, that the foregoing relates to exemplary embodiments of the invention and that modifications may be made without departing from the spirit and scope of the invention as set forth in the following claims.

What is claimed is:

1. An air filter system, comprising:
   two frames;
   each frame having a peripheral channel of a U-shaped cross-section receiving a periphery of an exterior filter made of filtration material; each channel having an inner flange and an exterior flange, the inner flange having an inner surface;
   a plurality of joining elements spaced apart along each inner surface so that said inner surfaces abut;
   the filtration material having an electrostatic attraction to microbes;
   a harness of insulation material, the harness having a first L-shape bracket and a second L-shaped bracket; and
   said first and second L-shaped brackets connected in such a way as to move between an open condition and a closed condition substantially interfacing an entirety of an exterior surface of each respective frame.

2. The air filter system of claim 1, further comprising an interior filter sandwiched between the exterior filters.

3. The air filter system of claim 2, wherein the interior filter is a fabric.

4. The air filter system of claim 1, wherein the plurality of joining elements are magnets of opposing polarities.

5. The air filter system of claim 1, wherein the plurality of joining elements are embedded into their respective inner surfaces.

6. The air filter system of claim 1, further comprising an electrical source coupled to one of the two frames.

7. The air filter system of claim 6, wherein the other of the two frames is grounded.

8. The air filter system of claim 1, wherein the two frames are made of the filtration material.

9. The air filter system of claim 1, each channel defines a nest space for said periphery to removably nest.

10. The air filtration system of claim 1, wherein said electrostatic attraction attracts pathogen-containing dust flowing through the air filtration system.

11. The air filter system of claim 2, wherein the interior filter extends to the exterior surface of each respective frame, and wherein said inner surfaces abut the interior filter.

* * * * *